J. PHILLIPS.
AUTOMATIC ICE CREAM CONE MACHINE.
APPLICATION FILED DEC. 9, 1919.

1,369,048.

Patented Feb. 22, 1921.
5 SHEETS—SHEET 1.

WITNESS:

INVENTOR
Joseph Phillips
BY
Frank L Busser
ATTORNEY.

J. PHILLIPS.
AUTOMATIC ICE CREAM CONE MACHINE.
APPLICATION FILED DEC. 9, 1919.

1,369,048.

Patented Feb. 22, 1921.
5 SHEETS—SHEET 2.

WITNESS:

INVENTOR
Joseph Phillips
BY
Frank S. Busser
ATTORNEY.

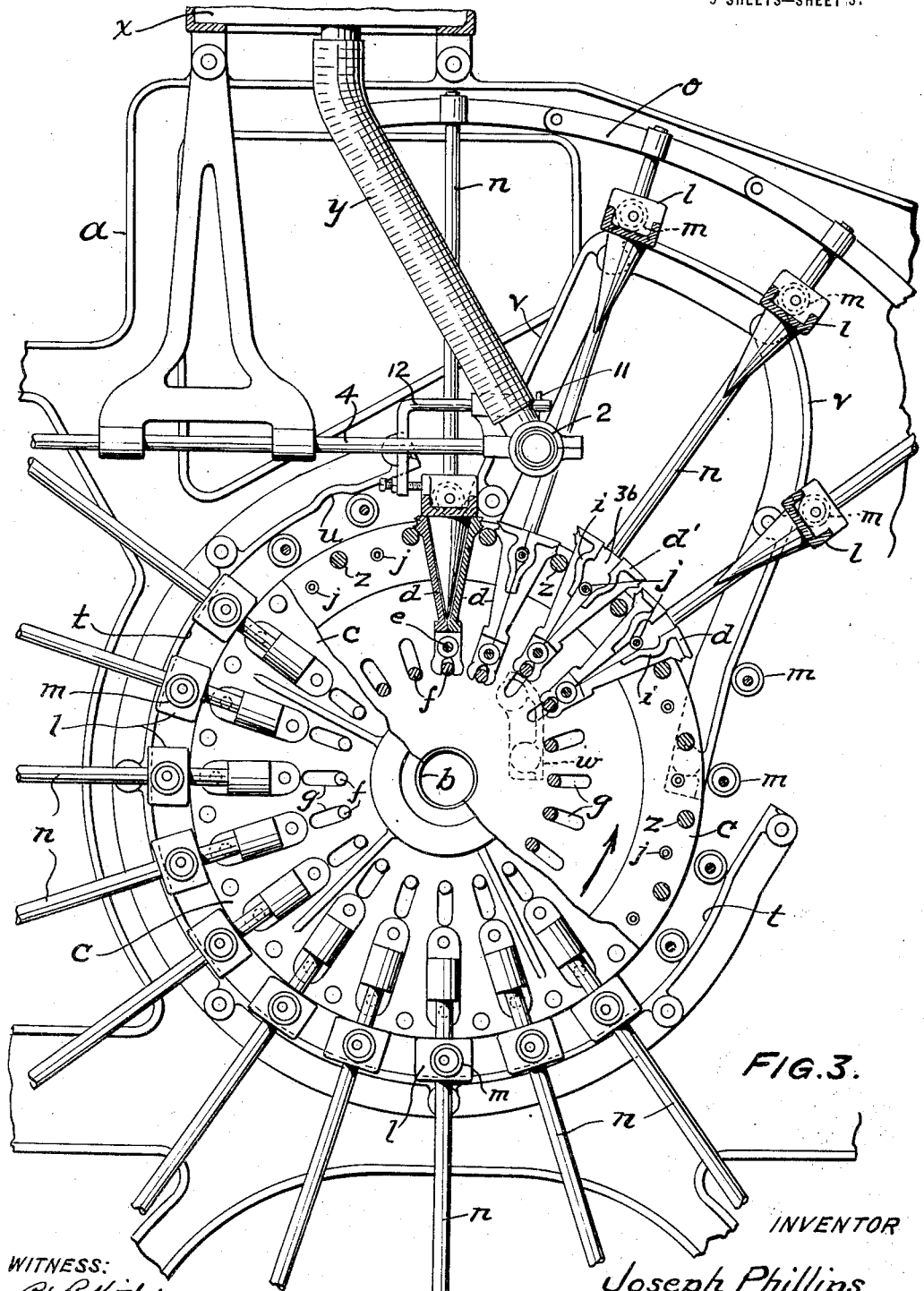

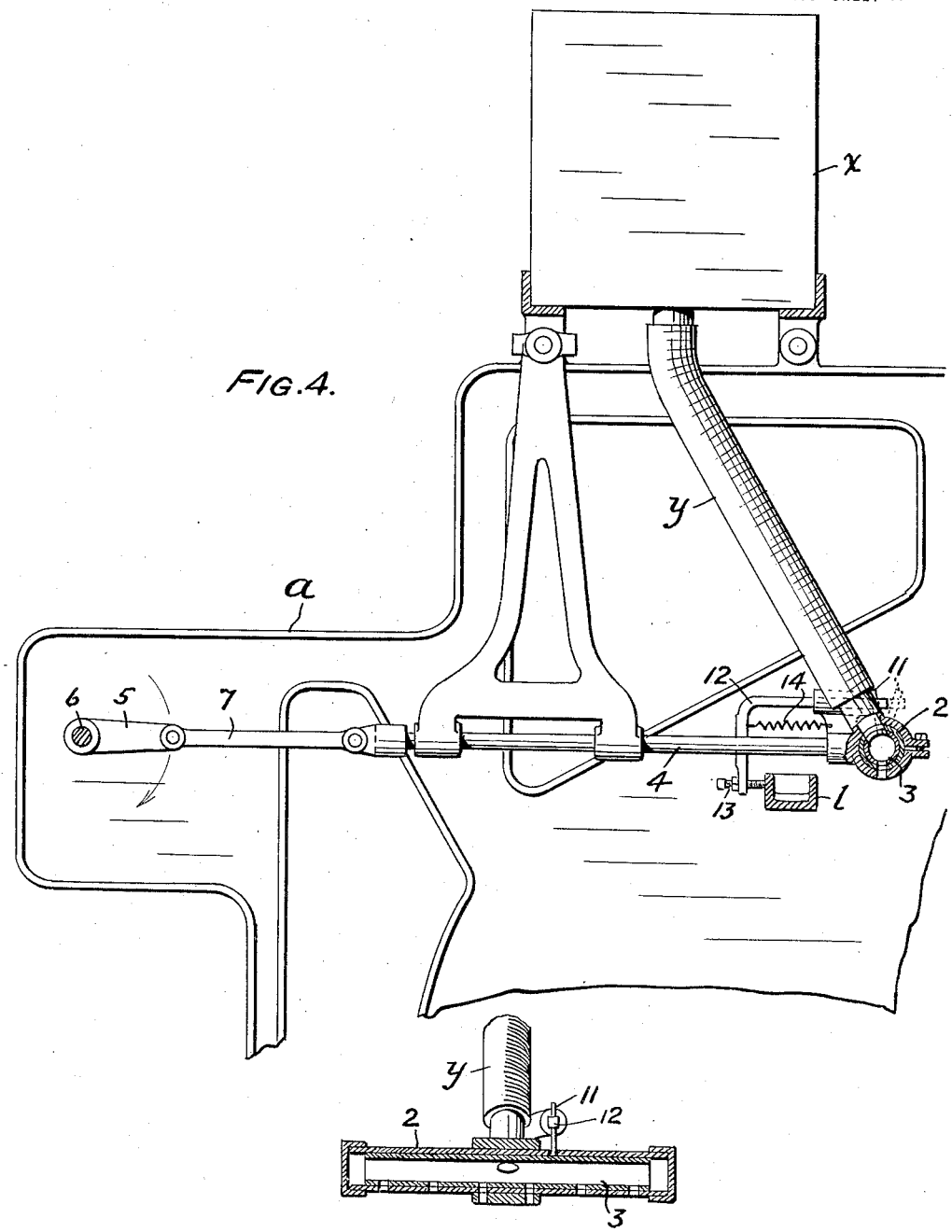

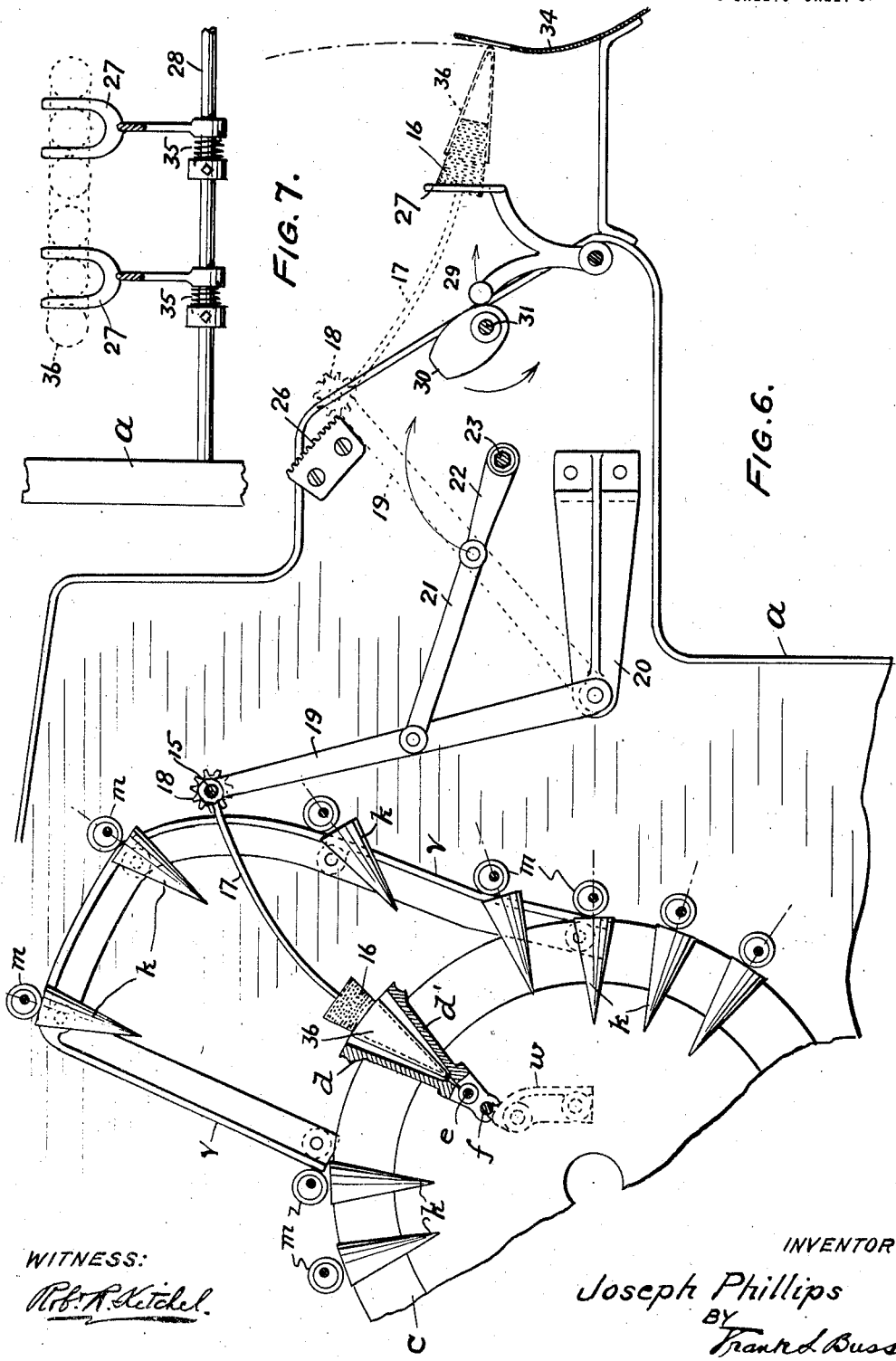

UNITED STATES PATENT OFFICE.

JOSEPH PHILLIPS, OF PHILADELPHIA, PENNSYLVANIA, ASSIGNOR, BY DIRECT AND MESNE ASSIGNMENTS, OF TWO-THIRDS TO BERZON & BREZIN, OF PHILADELPHIA, PENNSYLVANIA, A PARTNERSHIP COMPOSED OF LOUIS BERZON AND JOSEPH BREZIN, AND ONE-THIRD TO WILLIAM KOSAKOFF.

AUTOMATIC ICE-CREAM-CONE MACHINE.

1,369,048.     Specification of Letters Patent.     Patented Feb. 22, 1921.

Application filed December 9, 1919. Serial No. 343,481.

*To all whom it may concern:*

Be it known that I, JOSEPH PHILLIPS, a citizen of the United States, residing at Philadelphia, county of Philadelphia, and State of Pennsylvania, have invented a new and useful Improvement in Automatic Ice-Cream-Cone Machines, of which the following is a full, clear, and exact description, reference being had to the accompanying drawings, which form a part of this specification.

The object of my invention is to provide a machine for the manufacture of pastry cones of the type used in dispensing ice cream, and generally known as ice cream cones, which will be automatic in operation.

The machine constructed in accordance with my invention is adapted to deliver the batter in specified amounts, at intervals, to the molds in which the cones are baked, and finally deliver the finished cone.

I will now describe a preferred embodiment of my invention with reference to the accompanying drawings in which like symbols indicate similar parts in the various views and in which—

Fig. 3 is a detail view of the batter feed and molds, partly in section.

Fig. 4 is a detail view, partly in section, of the batter feed control.

Fig. 5 is a sectional view of the batter feed valve.

Fig. 6 is a detail view, partly in section, of the finished cone delivery.

Fig. 7 is a detail view of a part of the cone delivery.

Figure 1:
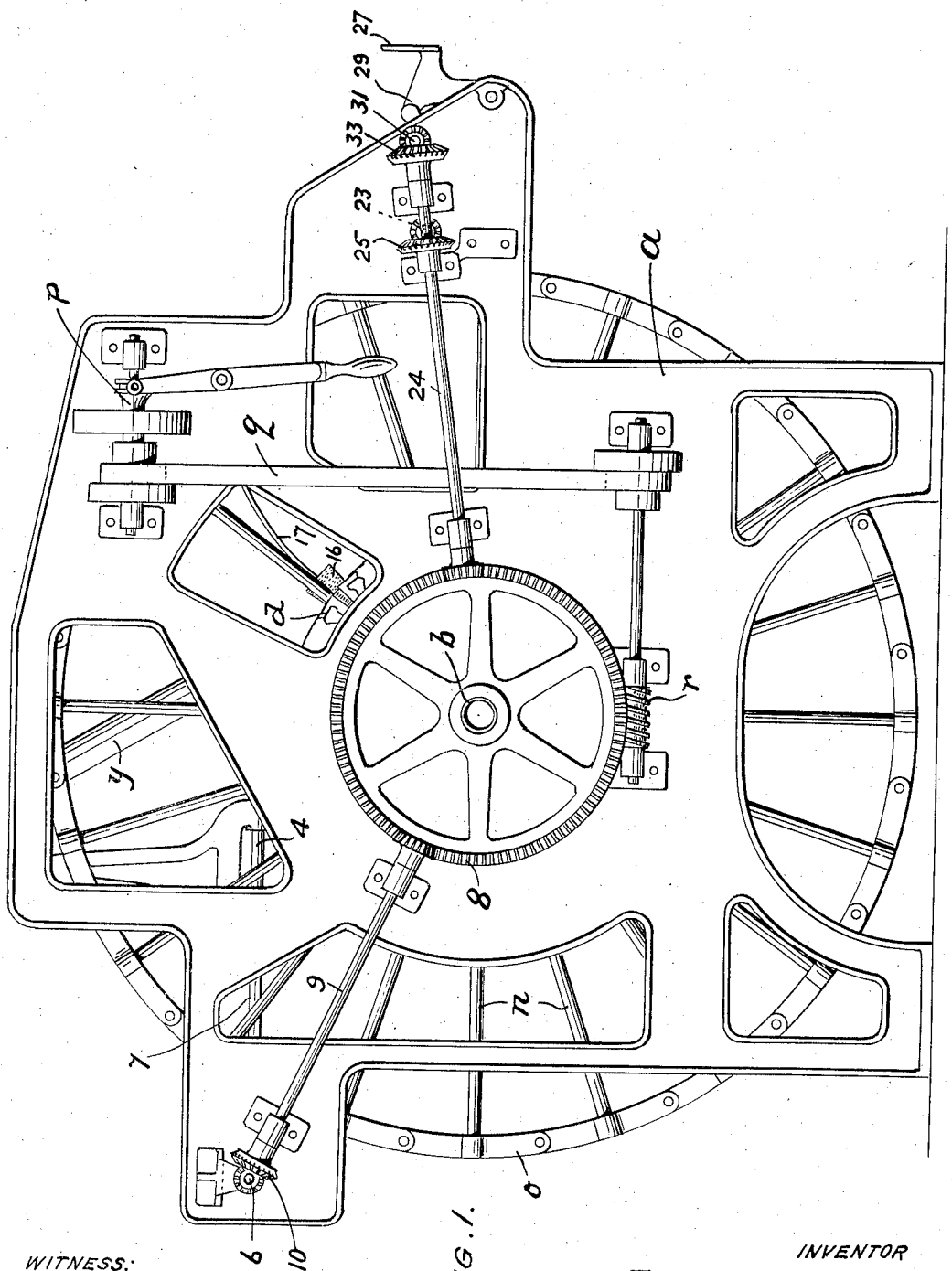
Figure 1 is a side elevation of the machine.
Figure 2:
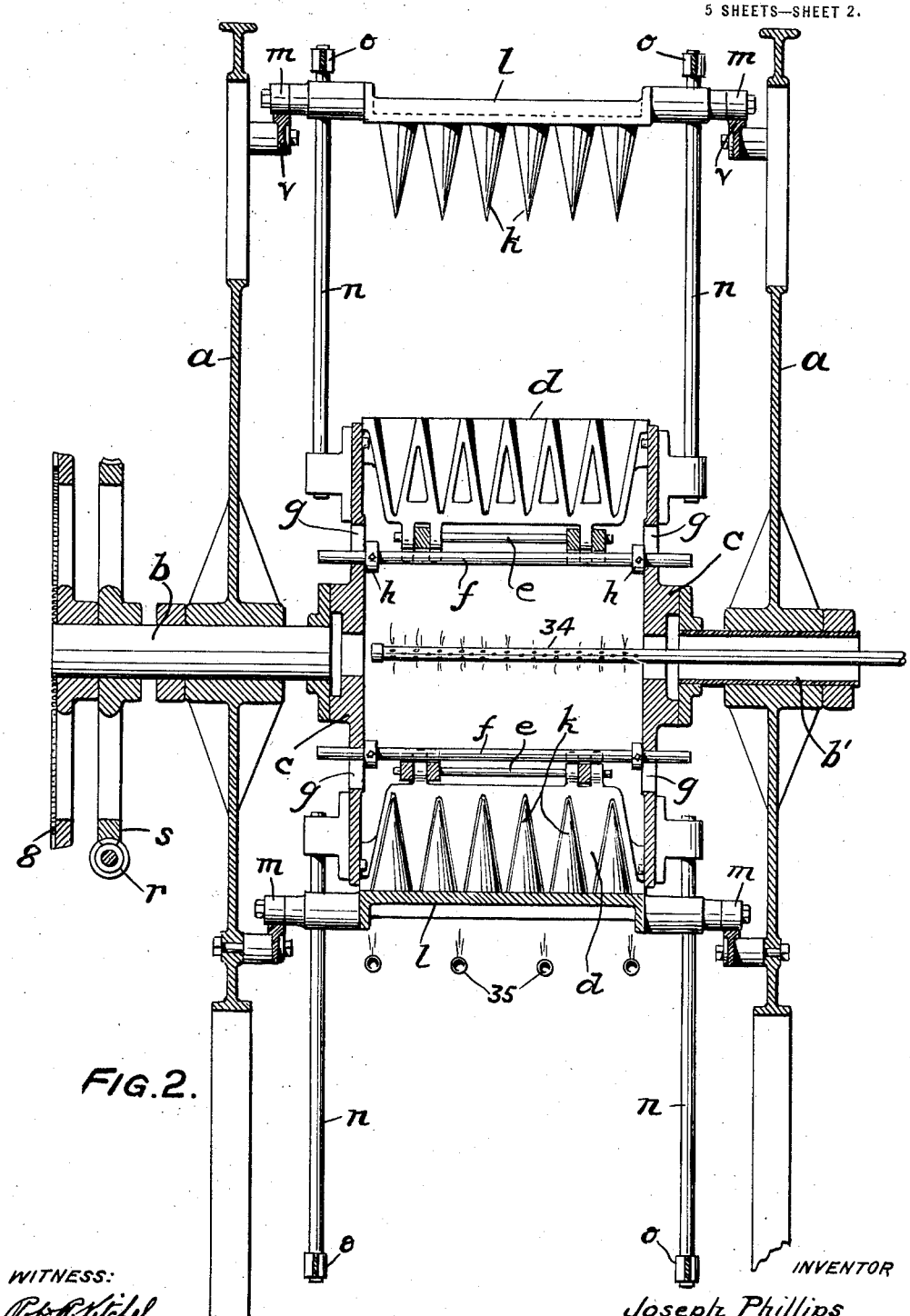
Fig. 2 is a sectional view of the machine.

The hollow shafts $b$ and $b'$ are journaled in frame $a$. To the inner ends of shafts $b$ and $b'$ respectively are secured frames $c$. The female molds, having a capacity as shown of six cones (although any number may be used), are formed in two sections $d$, $d'$ pivotally connected by a pin $e$ and movably supported by rods $z$, extending between the frames $c$, and by rods $f$, the ends of which are engaged in the guide slots $g$ in the frames $c$ and upon which a pair of collars $h$ are mounted to position the rods. The ends of the molds are provided with converging ears $i$, between which extend pins $j$, projecting from the frames $c$. The male elements $k$ of the molds are secured to cross heads $l$, provided at each end with rollers $m$. The cross heads are slidably mounted on rods $n$, each of which is secured at one end to frames $c$ and at the other end are connected circumferentially by ties $o$. The molds as above described are arranged radially of a circle, and the frames $c$, molds and rods $n$ are all adapted to be rotated together by means of suitable power applied through clutch $p$, belting $q$, worm $r$, and worm wheel $s$, secured to shaft $b$. The molds are heated by heat applied to the central chamber which the molds surround by means of a gas burner 34 extending through hollow shaft $b'$ and by burners 35.

The cams $t$, concentric with the axis of the machine except for the offsets $u$, are secured to the inside of the side members of the frame $a$ to guide rollers $m$ on cross heads $l$ during the baking operation. Cams $v$, having a relatively sharp rise and fall, are secured similarly to frame $a$, to lift the male members of the molds. Short cams $w$ are secured to the frame $a$ and are adapted to act on the ends of rods $f$.

Above the molds and supported by the frame $a$ is a batter tank $x$, from which leads a flexible pipe $y$ opening into a feed manifold 2 provided with feed holes corresponding to the number of units in each mold,—in this case six. Within the manifold is a rotary valve 3 provided with holes and adapted to open or close the holes in the manifold. The manifold is carried on the end of a rod 4 which is reciprocated by a crank 5 on a shaft 6 journaled in the frame through a link 7. The shaft 6 is driven by a bevel ring gear 8 secured to worm wheel $s$ through shaft 9, journaled to the frame, and pinions 10.

From the valve 3 a stem 11 extends through the manifold and is secured to a rod 12 slidably supported in a bearing carried by the manifold. The rod 12 is provided with a downward extension, provided with an adjustable stop 13. The valve is adapted to be opened, in the reciprocation of the manifold, by means of the stop 13 contacting with a cross head $l$. A spring 14 returns the valve to closed position when the stop is out of contact.

The cones 36 are removed from the molds by means of wire brushes 16 in the form of truncated cones. Rods 17 carrying the brushes are secured to rods 15 having pinions 18 on their ends and carried by arms 19, which are in turn pivoted to suitable hangers 20 secured to the sides of the frame. A shaft 23, running transversely of and supported by the frame $a$, carries crank arms connected to arms 19 through links 21. Shaft 23 is driven from the ring gear 8 through shaft 24 and pinions 25. Racks 26 are secured to the frame in the path of pinions 18, so that in the movement of arms 19 in one direction the pinions will strike the racks and be turned, causing rods 17 and brushes 16 to be turned over, and in the reverse movement turned back.

For the removal of the cones from the brush, forks 27 are supported on a rod 28, journaled in the frame; arms 29 extend from the forks into the path of cams 30 secured to a shaft 31 which is driven by pinions 33 on shaft 24. The forks are spring-returned by springs 35 attached to collars on shaft 28.

The cones are finally delivered through individual apertures in a shield 34, which is arranged to form a chute down which the cones slide and which permits them to nest.

In operation, the burners 34 and 35 are lighted and the molds slowly rotated until they become properly heated. As the molds rotate the male elements are periodically withdrawn from the female elements, during which time the female elements are split and the baked cones removed. The female elements are again closed, the batter put in and the male elements dropped into place. The baking operation then occurs. It will be obvious that since the molds are arranged circumferentially of a circle the production of cones will be substantially continuous.

In order that the operation may be clearly understood, I will follow the course of one of the molds.

As a mold approaches the batter feeding manifold 2, the manifold in its reciprocation is moved toward the mold. The stop 13 strikes the cross head $l$ of the preceding mold, stopping the rod 12 and causing the valve stem 11 to move and turn the valve 3 in the manifold to open the feed holes. When the feed holes are open, the mold is beneath them and the batter flows into it. As the mold passes on, the manifold in its reciprocation moves stop 13 away from the cross head $l$, and out of its way, and the valve closes. The male elements of the mold, during this time, are in raised position, as will be hereinafter explained. As the molds move on, after being supplied with batter, the male elements are allowed to descend into the female elements and do so by their own weight. The entry of the male elements into the female elements distributes the batter.

With the further advance of the mold, the rollers $m$ on cross head $l$ are engaged by circular cams $t$ and the male elements are thereby securely held in position within the female elements. With the initial heating of the batter, a certain amount of pressure is developed and this is released, when the rollers arrive at the offsets $u$, which permit the male members to lift slightly.

The baking process now proceeds until the rollers leave cams $t$. Upon leaving cams $t$ the rollers are engaged by cams $v$ which lift them, causing the cross heads to be raised on rods $n$ and lifting the male elements out of the female elements. The ends of rod $f$ then strike the short cams $w$ and the rods are lifted in guide slots $g$ raising the female elements clear of supporting rods $z$ and causing the pins $j$ to exert a wedge action on the ears $i$, which results in splitting the female element and freeing the cones.

The delivery mechanism is timed so that, when the male element is lifted out of the way and the mold split, the brushes 16 will enter the cones and frictionally engage them (in this case two brushes are provided which enter cones two and four of the set of six). In the reciprocation of the brushes the cones are extracted from the mold and carried out, until the pinions 18 strike the racks 26, which cause the pinion to be rotated and the brushes turned over and positioned between the forks 27 as shown in dotted lines, Fig. 6. When the brushes are in this position, the cam 30 has moved to a position to act on arm 29, and it then causes the forks to be advanced to push the cones off the brushes and through individual apertures in shield 34, the edges of which separate the cones from each other by breaking the skim which connects them, due to slight overflow of the molds. The cones then slide down behind the shield and land, one in the other, nested for packing.

The forks are returned to normal position by springs 35 after the cams 30 release arms 29. The delivery mechanism is reciprocated back and the brushes again turned by racks 26 into position to engage the cones in the following mold.

After the cones are withdrawn by the brushes, the end of rods $f$ leave the cams $w$ and the female element of the mold is allowed to drop back into its normal closed position by its own weight. The female element then proceeds to the batter supply and upon being supplied receives the male element, which is permitted to fall off the cams *v* into the female element. The rear face of cam *v* is so formed that the fall of the male element will be somewhat gradual, in order that the batter will not be unduly splashed about.

The action of each of the molds is similar to that described and each step in the process of production of the cones is substantially continuous and the entire operation completely automatic.

The female elements may be readily removed for cleaning or repairs since they are held in position merely by their own weight supported on rods *f* and *z*. The male elements may readily be detached by merely removing the ties *o* and sliding the cross heads off the rods *n*.

It will be obvious that the molds can be constructed for any number of cones and the capacity of the machine, described, increased or decreased as desired.

Having now fully described my invention, what I claim and desire to protect by Letters Patent is:—

1. In a machine for making ice cream cones, the combination with a continuously rotating frame, of sets of female mold members arranged radially of and movable outwardly from the axis of said frame, sets of male mold members adapted to restrain the female mold members from moving outwardly, said male mold members being movable radially outwardly to permit outward movement of the female members guides for the mold members, and means for causing the male and female mold members to move radially with relation to the frame and to each other.

2. In a machine for making ice cream cones, the combination with a continuously rotating frame, of sets of female mold members arranged radially of and movable outwardly from the axis of the frame, guides on the frame for the female mold members, means to move said members outwardly, sets of male mold members arranged radially of the frame and adapted to prevent outward movement of the sets of female members, radially disposed guides on the frame for the male mold members, and means to move said sets of male members outwardly to permit outward movement of said female members.

3. In a machine for making ice cream cones, the combination with a rotating frame, of sets of female mold members comprising separable sections arranged radially of and outwardly movable from the axis of the frame, guides on the frame for the female mold members, means adapted to effect an outward movement of and simultaneously a separation of the sections of the sets of female members, sets of male mold members arranged radially of and outwardly movable from the axis of said frame adapted normally to prevent outward movement of the sets of female members, radially disposed guides on the frame for the male mold members, and means adapted to effect an outward movement of the sets of male members successively and permit outward movement of the sets of female members.

4. In a machine for making ice cream cones, the combination with a continuously rotating frame, of sets of female mold members comprising separable sections arranged radially of and outwardly movable from the axis of said frame, guides on the frame for the female mold members, means to move said sets of female members outwardly, means adapted to effect a separation of the sections forming said sets of female members in the outward movement, sets of male mold members arranged radially of said frame adapted to prevent outward movement of the sets of female members, radially disposed guides on the frame of the male mold members, and means to move said sets of male members radially and permit outward movement of said sets of female members.

5. In a machine for making ice cream cones, the combination with a continuously rotating frame, of sets of female mold members arranged radially of and movable outwardly from the axis of said frame, guides on the frame for the female mold members, said sets of female members comprising separable sections, means adapted to effect the separations of said sections in the outward movement of said sets of female members, means adapted to effect the joining of said sections, sets of male mold members arranged radially of and movable outwardly from the axis of said frame adapted to enter the sets of female members, radially disposed guides on the frame for the male mold members, means to move said sets of male members outwardly, and means to prevent outward movement of said sets of male members when within the female mold members.

6. In a machine for making ice cream cones, the combination with a continuously rotating frame, of sets of female mold members arranged radially of and outwardly movable from the axis of said frame, guides on the frame for the female mold members, said sets of female members comprising separable sections, a cam arranged to effect an outward movement of said sets of female members successively, during the rotation of the frame, cams adapted to effect a separation of the sections of the sets of female members in their outward movement, means to effect the joining of the sections, sets of male mold members arranged radially of said frame and adapted normally to enter the female members, radially disposed guides on the frame for the male mold members, means to retain the sets of male members within the female members, and means to effect a radial outward movement of the sets of male members successively to permit of the outward movement of the sets of female members successively.

7. In a machine for making ice cream cones, the combination with traveling male molds and female molds, the latter being split longitudinally, of a cam adapted, in the travel of the molds, to move the female molds longitudinally, a pin adapted, in the longitudinal movement of the female molds by the cam, to separate their sections, and means extending between adjacent sets of molds coöperating with the molds, under the influence of their own weight, to rejoin the sections.

8. In a machine for making ice cream cones, the combination with traveling male molds and female molds, the latter being split longitudinally, of a cam adapted, in the travel of the molds, to move the female molds longitudinally, and a pin adapted, in the longitudinal movement of the female molds by the cam, to separate their sections.

9. In a machine for making ice cream cones, the combination with a rotary frame having two sets of radial guides, of a series of sets of sectional female mold members mounted on one set of guides, a series of male mold members corresponding to the sets of female mold members mounted on the other set of guides, means for opening and closing the female mold members when moved radially on the frame, means for moving the male mold members outwardly from the female members and to permit them to move inwardly into the female mold members, and means to move the female mold members outwardly to open the female mold members after the male mold members have been withdrawn and to permit them to move inwardly to close the molds before the male mold members move inwardly.

10. In a machine for making ice cream cones, the combination with a rotary frame, of a series of sets of female molds and a corresponding series of sets of engaging male molds, means to bodily rotate the male and female molds with the frame, each set of female molds being formed in two sections pivoted near their narrower ends, pins carried by the frame extending between the respective sections of the female molds, and a cam adapted, in the rotation of the frame, to push the sets of female molds successively radially, thereby causing said pins to separate the outer ends of the sections of the female molds.

11. In a machine for making ice cream cones, the combination with a rotary frame, of pins arranged circumferentially on the frame, radially extending female molds alternating with the pins and normally loosely confined between adjacent pins, each mold comprising two sections pivoted together near its inner end, pins each extending between the inner extremities of the mold sections, the last named pins slidable in vertical slots in the frame, a cam adapted, in the rotation of the frame, to engage the last named pins successively and thereby slide them radially outward, and pins each extending between sections of a mold and adapted, in the outward radial sliding movement of the molds, to spread the mold sections apart.

12. In a machine for making ice cream cones, the combination with sets of traveling male molds and female molds, the latter being split longitudinally, of means engaging the male molds successively to hold the molds in engagement during the baking operation, means to successively withdraw sets of male molds from their respective female molds, means to successively separate the sections of the female molds, a cone extractor, and means to move said extractor into and withdraw it from the sets of female molds successively while their sections are separated, thereby withdrawing the baked cones.

13. In a machine for making ice cream cones, the combination with a rotary frame having two sets of radial guides, of a series of sets of sectional female mold members mounted on one set of guides, a series of male mold members corresponding to the sets of female mold members mounted on the other set of guides, means for opening and closing the female mold members when moved radially on the frame, means for moving the male mold members outwardly from the female members and to permit them to move inwardly into the female mold members, means to move the female mold members outwardly to open the female mold members after the male mold members have been withdrawn and to permit them to move inwardly to close the molds before the male mold members move inwardly, and means to retain the male mold members in the female mold members.

14. In a machine for making ice cream cones, the combination with a rotary frame, of a series of sets of female molds and a corresponding series of sets of engaging male molds, means to bodily rotate the male and female molds with the frame, each set of female molds being formed in two sections pivoted near their narrower ends, pins carried by the frame extending between the respective sections of the female molds, and a cam adapted, in the rotation of the frame, to push the sets of female molds successively radially, thereby causing said pins to separate the outer ends of the sections of the female molds, the said sections being rejoined under the influence of their own weight.

15. In a machine for making ice cream cones, the combination with sets of male molds and complementary sets of female molds, of means to withdraw the sets of male molds, a set of cone extractors, means to enter said extractors into and withdraw them from the sets of female molds successively and successively position the cones for discharge, and a set of ejectors comprising members movable between adjacent extractors of a set and adapted to engage the cones and free them from the extractors.

16. In a machine for making ice cream cones, the combination with the mold, of a conical extractor adapted to enter and withdraw from the mold, thereby carrying a cone with it, and position the cone for discharge, a shaft, means to oscillate the shaft, and fingers turnable with the shaft and adapted to extend between adjacent extractors when the shaft is oscillated in one direction and thereby slip the cones off the extractor.

17. An ice cream cone machine having a rotary frame, outwardly opening female mold members radially movable on the frame, cam means for opening and closing said mold members, male mold members, radial guides on the frame for the male mold members, cam means for moving the male mold members outwardly from the female mold members and to permit them to return into position with relation to the female mold members, means for charging the female mold members when the male mold members are withdrawn, and means for retaining the male mold members in the female mold members after they have been charged.

18. An ice cream cone machine having a rotary frame, outwardly opening female mold members radially movable on the frame, cam means for opening and closing said mold members, male mold members, radial guides on the frame for the male mold members, cam means for moving the male mold members outwardly from the female mold members and to permit them to return into position with relation to the female mold members, means for charging the female mold members when the male mold members are withdrawn, and means for retaining the male mold members in the female mold members after they have been charged, said last mentioned means also being arranged to hold the female mold members closed through the medium of the male mold members.

19. In a machine for making ice cream cones, the combination with male and female molds, of means to withdraw the male molds, a cone extractor, means to enter said extractor into the female molds, withdraw it therefrom and swing it through an arcuate path into position for discharge of the cones, and means positioned in the path of said extractor adapted to remove the cones therefrom.

20. An ice cream cone machine having a supporting frame, a drum rotatably supported thereby, said drum being formed of side walls and a plurality of female mold members forming a portion of the periphery, each mold member having two separable sections, means to heat the interior of the drum, and supporting means on the drum to separate the mold sections when moved outwardly, other means to move the mold sections toward each other when moved inwardly, means for moving the mold sections, and a plurality of male mold members arranged to coact with the female mold members.

21. An ice cream cone making machine comprising a rotary drum having side walls, a plurality of rods connected to the side walls near the periphery thereof, a sectional female mold member supported in each space between adjacent rods and together with said rods forming the periphery of the drum, means for supplying heat to the interior of the drum, means to rotate the drum, means to move the female mold members radially at a predetermined point in the rotation of the drum, cam means for separating the mold sections when moved outwardly and to move the sections toward each other when moved inwardly, and male mold members arranged to coact with the female mold members.

In testimony of which invention, I have hereunto set my hand, at Philadelphia, Pa., on this 8th day of December, 1919.

JOSEPH PHILLIPS.